United States Patent
Graciannette et al.

(10) Patent No.: US 7,302,601 B2
(45) Date of Patent: Nov. 27, 2007

(54) DEVICE AND METHOD FOR SYNCHRONIZING AN EXCHANGE OF DATA WITH A REMOTE MEMBER

(75) Inventors: Nicolas Graciannette, Meylan (FR); Benoit Marchand, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 1142 days.

(21) Appl. No.: 10/405,958

(22) Filed: Apr. 2, 2003

(65) Prior Publication Data
US 2003/0218484 A1 Nov. 27, 2003

(30) Foreign Application Priority Data
Apr. 2, 2002 (FR) .................................. 02 04070

(51) Int. Cl.
*G06F 1/04* (2006.01)
(52) U.S. Cl. ..................... 713/401; 713/400; 713/500; 713/501; 713/502; 713/503; 713/600; 713/601; 365/233
(58) Field of Classification Search ........ 713/400–401, 713/500–503, 600–601; 365/233
See application file for complete search history.

(56) References Cited
U.S. PATENT DOCUMENTS 6,681,272 B1 * 1/2004 Anderson et al. ............. 710/52
6,904,538 B2 * 6/2005 Glas et al. ................... 713/401
6,966,009 B1 * 11/2005 Boduch ....................... 713/500
7,003,686 B2 * 2/2006 Chua-Eoan et al. ........ 713/600
7,020,793 B1 * 3/2006 Hsieh .......................... 713/401

* cited by examiner

*Primary Examiner*—A. Elamin
(74) *Attorney, Agent, or Firm*—Lisa K. Jorgenson; Stephen Bongini; Fleit Kain Gibbons Gutman Bongini & Bianco P.L.

(57) ABSTRACT

A device is provided for synchronizing, on a reference clock signal, an exchange of data with a remote member. The device includes a main variable delay line controlled by a first processing unit coupled to a phase comparator in order to generate a delayed clock signal transmitted to the remote member. One input of the main variable delay line receives the reference clock signal. The device also includes a first terminal for receiving a clock signal image received by the remote member, a first auxiliary variable delay line having one input connected to the first terminal and one output connected to a first input of the phase comparator, a second auxiliary variable delay line having one input connected to the input of the main variable delay line and one output connected to a second input of the phase comparator, and a second processing unit controlling the first and second auxiliary variable delay lines so that the signal image received by the remote member is offset with respect to the reference clock signal, by a phase suitable for synchronizing the exchange of data on the reference clock signal.

16 Claims, 4 Drawing Sheets

DEVICE AND METHOD FOR SYNCHRONIZING AN EXCHANGE OF DATA WITH A REMOTE MEMBER

CROSS-REFERENCE TO RELATED APPLICATIONS

This application is based upon and claims priority from prior French Patent Application No. 02-04070, filed Apr. 2, 2002, the entire disclosure of which is herein incorporated by reference.

BACKGROUND OF THE INVENTION

1. Field of the Invention

The present invention relates to data exchange, and in particular to data exchange synchronization between a local member and a remote member.

2. Description of Related Art

In general, a local member has a reference clock signal which is transmitted to a remote member in order to participate in an exchange of data with the remote member.

The problem is that the remote member receives the reference clock signal with a certain delay with respect to its generation in the local member. This delay means that the clock signals in the local member and in the remote member are no longer in phase.

For example, the local member can be a memory controller housed in an integrated circuit and the remote member can be a synchronous memory such as an SDRAM memory. The integrated circuit which houses the memory controller and the integrated circuit which houses the memory are placed on a printed circuit, connected by tracks having resistive, capacitive and inductive properties suitable for generating a certain delay on the transmitted signals. At the ever higher frequencies for exchange between the circuits, these delays have a considerable effect on the synchronization of signals.

One solution to this problem is to deliberately introduce a delay in the local member before transmission of the clock signal and to adjust this delay so as to compensate for the uncontrollable delay outside the integrated circuit which houses the local member, so that the clock signal in the remote member has a phase suitable for ensuring the synchronization of the exchange of data.

Typically, the signal subjected to the uncontrollable external delay is looped back on the reference clock signal at the input of a phase comparator. The delay introduced into the local member is adjusted so as to cancel out the phase difference at the input of the phase comparator. One drawback of this solution is that it only allows the delay on the signal subjected to the uncontrollable external delay to be controlled by cancelling out the phase difference at the input of the comparator. Such a solution presents problems when the data, for example generated by the remote member, are valid within a window of validity, that is to say within a range which precedes, succeeds or is superimposed on the clock wavefront. It is then difficult to impose a phase difference other than a zero value at the input of the phase comparator.

SUMMARY OF THE INVENTION

In view of these drawbacks, it is an object of the present invention to remove the above-mentioned drawbacks and to provide a device for synchronizing an exchange of data with a remote member.

One embodiment of the present invention provides a device for synchronizing, on a reference clock signal, an exchange of data with a remote member. The device includes a phase comparator, a first processing unit coupled to an output of the phase comparator, a main variable delay line, a first terminal for receiving a clock signal image received by the remote member, first and second auxiliary variable delay lines, and a second processing unit. The main variable delay line is controlled by the first processing unit so as to generate a delayed clock signal for transmission to the remote member, with one input of the main variable delay line receiving the reference clock signal. The first auxiliary variable delay line has one input coupled to the first terminal and one output coupled to a first input of the phase comparator, and the second auxiliary variable delay line has one input coupled to the input of the main variable delay line and one output coupled to a second input of the phase comparator. The second processing unit controls the first and second auxiliary variable delay lines so that the signal image received by the remote member is offset with respect to the reference clock signal, by a phase suitable for synchronizing the exchange of data on the reference clock signal. In a preferred embodiment, the device also includes a switch coupled between the first terminal and the input of the first auxiliary variable delay line.

Another embodiment of the present invention provides a method for synchronizing, on a reference clock signal, an exchange of data with a remote member, by generating a delayed clock signal transmitted to the remote member having a main delay with respect to the reference clock signal, the main delay being a function of a control signal, in order to cancel out a phase difference received at the input of a phase comparator. According to the method, a clock signal image received by the remote member is subjected to a first auxiliary delay in an established regime, and the reference clock signal is subjected to a second auxiliary delay. The phase difference between the received clock signal image subjected to the first auxiliary delay and the reference clock signal subjected to the second auxiliary delay is compared, so as to offset the clock signal image received by the remote member with respect to the reference clock signal, by a phase suitable for synchronizing the exchange of data on the reference clock signal in the established regime.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
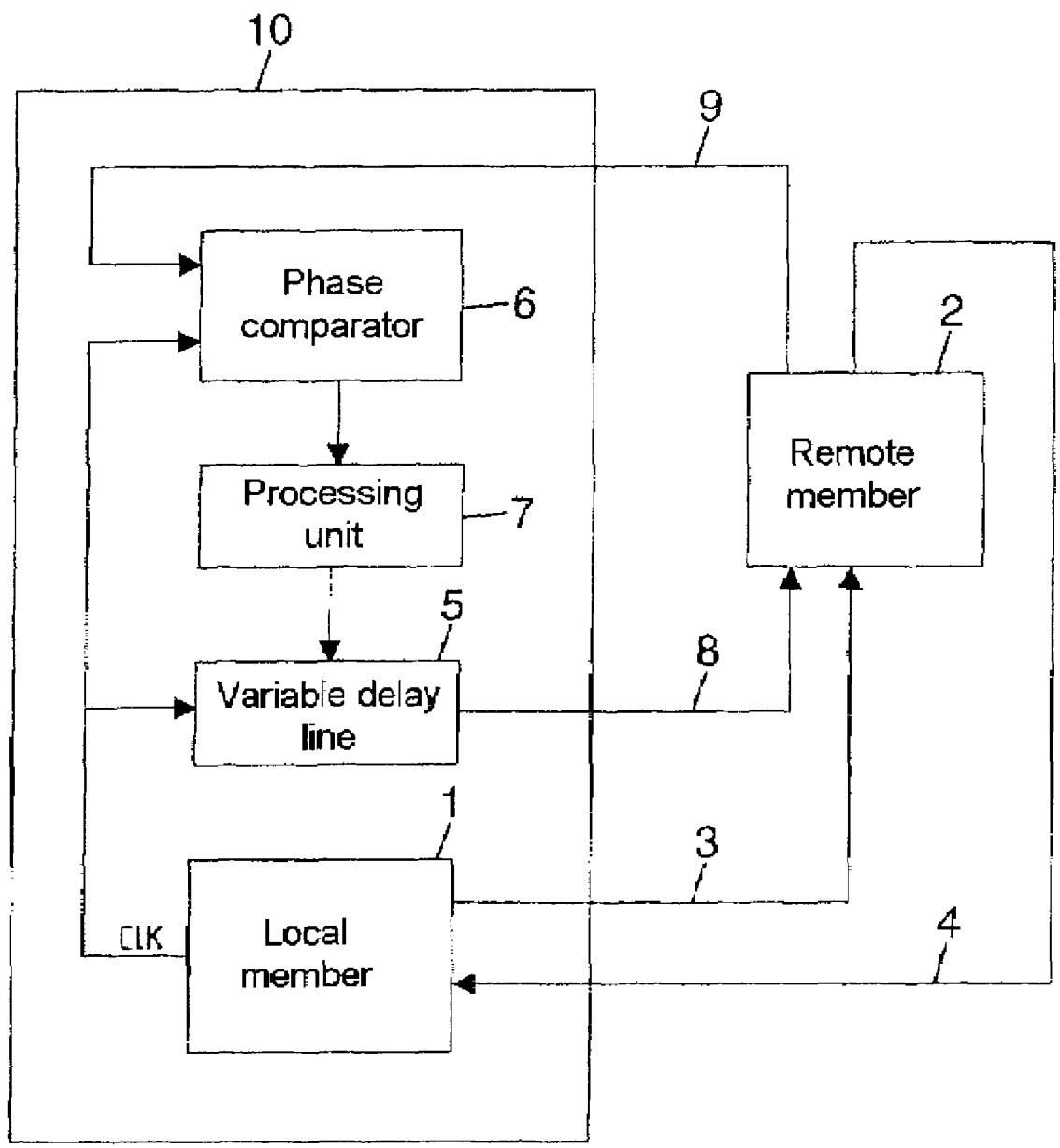
FIG. 1 is a diagram of a conventional device.

Preferred embodiments of the present invention will be described in detail hereinbelow with reference to the attached drawings.

Preferred embodiments of the present invention provide a device for synchronizing, on a reference clock signal, an exchange of data with a remote member. The device includes a main variable delay line controlled by a first processing unit in order to generate a delayed clock signal transmitted to the remote member so as to cancel out a difference at the input of a phase comparator. One input of the main variable delay line receives the reference clock signal. The device further includes a first terminal for collecting a clock signal image received by the remote member, first and second auxiliary variable delay lines, and a second processing unit. The first auxiliary variable delay line has one input connected to the first terminal and one output connected to a first input of the phase comparator. The second auxiliary variable delay line has one input connected to the input of the main variable delay line and one output connected to a second input of the phase comparator. The second processing unit controls the first and second auxiliary variable delay lines so that the signal image received by the remote member is offset with respect to the reference clock signal, by a phase suitable for synchronizing the exchange of data on the reference clock signal.

Thus, when the signals are in phase at the inputs of the phase comparator, that is to say at the output of each of the auxiliary variable delay lines, the clock signal image received by the remote member is offset at the input of the first variable auxiliary delay line, with respect to the reference clock signal at the input of the second variable auxiliary delay line, by a delay equal to the difference of the delays generated by the auxiliary delay lines. The second processing unit makes it possible to adjust this difference in delay with high accuracy so as to offset the signal image received by the remote member with respect to the reference clock signal, by a phase suitable for synchronizing the exchange of data on the reference clock signal.

Preferably, the device includes a switch inserted between the first terminal and the input of the first variable delay line so as to be able to connect the input of the first variable delay line to one output of the main variable delay line. This switch makes it possible to calibrate, if necessary, the auxiliary delay lines.

Preferably, (independent of whether or not the switch is present) the second processing unit includes an input that receives a data recognition signal so as to adjust the delay of the first or second auxiliary variable delay line so that the data recognition signal indicates agreement of data. This input makes it possible to directly adjust the auxiliary variable delay lines, whether or not they are calibrated.

In one preferred embodiment, the first terminal includes first and second galvanic isolation amplifiers. The first galvanic isolation amplifier has one input connected to one output of the main variable delay line, and one output provided for connection to a track for transmission toward the remote member. The second galvanic isolation amplifier has one input connected to the output of the first galvanic isolation amplifier, and one output connected to the input of the first auxiliary variable delay line. The second galvanic isolation amplifier makes it possible to collect a clock signal image received by the remote member, and the first galvanic isolation amplifier makes it possible to transmit the delayed clock signal to the remote member without additional wiring.

The present invention also provides a method for synchronizing, on a reference clock signal, an exchange of data with a remote member, by generating a delayed clock signal transmitted to the remote member having a main delay with respect to the reference clock signal, the main delay being a function of a control signal, in order to cancel out a phase difference received at the input of a phase comparator. According to the method, a clock signal image received by the remote member is subjected to a first auxiliary delay in an established regime, and the reference clock signal is subjected to a second auxiliary delay. The phase difference received at the input of the phase comparator is a phase difference between the received clock signal image subjected to the first auxiliary delay and the reference clock signal subjected to said second auxiliary delay, such that the clock signal image received by the remote member is offset with respect to the reference clock signal, by a phase suitable for synchronizing the exchange of data on the reference clock signal in the established regime.

Preferably, in a preparatory regime outside the established regime, the delayed clock signal is subjected to the first auxiliary delay, and the second auxiliary delay is taken to be equal to the first auxiliary delay. Different values of the control signal are recorded, each for a different frequency of the reference clock signal, so as to recognize a law of variation of the main delay, then equal to a clock period, as a function of the control signal.

In one preferred method, in the preparatory regime, the clock signal image received by the remote member is subjected to the first auxiliary delay, and a succession of at least one exchange of known data with the remote member is activated by making the first and/or the second auxiliary delay vary until detecting synchronization of exchange of known data.

In another method, outside the preparatory regime, each of two values are allocated respectively to the first and second auxiliary delays such that the difference between the two values corresponds to a window known a priori for synchronizing data exchanges.

Exemplary embodiments of the present invention will now be described with reference to the figures.

FIG. 1 shows an example of a conventional device for synchronizing, on a reference clock signal, an exchange of data with a remote member. A local member 1 sends an command for exchanging data to the remote member 2, over a line 3. The remote member 2 is, for example, a synchronous memory. The local member 1 is then a memory controller. The exchange of data between the local member 1 and the remote member 2 is then carried out over a line 4. The local member 1 is synchronized by a reference clock signal CLK. The remote member 2 receives, via a line 8, a clock signal of a frequency identical to the reference clock signal CLK, with the aim of synchronizing the exchange of data with the local member 1, on the reference clock signal CLK.

The local member 1 is physically embodied in an integrated circuit 10. The remote member 2 is itself also physically embodied in another integrated circuit. The lines 4 and 8 are physically embodied as tracks on a printed circuit on which are placed the integrated circuits in which the local member 1 and the remote member 2 reside. The track of line 8 introduces a delay on the clock signal such that the signal received by the remote member 2, although of the same frequency as the reference clock signal CLK, is phase-shifted with respect thereto. Furthermore, the track of line 4 itself also introduces a delay which means that, without a suitable device, the data exchanged on line 4 has little chance of being synchronous both with the local member 1 and with the remote member 2. The delay accumulated on line 8, possibly in the remote member 2, then on line 4, depends on many parameters such as the temperature, the track length of line 8 and of line 4, and on the technology of the integrated circuits.

The device of FIG. 1 includes a variable delay line 5, a phase comparator 6 and a processing unit 7. The phase comparator 6 receives, on the one hand, the reference clock signal CLK and, on the other hand, a clock signal image received by the remote member 2. In this case, the signal image received by the remote member 2 is transmitted from the remote member 2 to the phase comparator 6 via a line 9. If line 9 is physically embodied by a track of a printed circuit with a length and cross section identical to the track of line 4, a cumulated delay is observed on line 8, possibly in the remote member 2 and on line 9, identical to the cumulated delay on line 8, possibly in the remote member 2 and on line 4. Thus, a zero phase difference on the phase comparator 6 guarantees a zero phase difference between the reference clock signal CLK and the data exchanged on line 4, at the local member 1.

The processing unit 7 receives from the phase comparator 6, the phase difference between the reference clock signal CLK and the return of the line 9. The processing unit 7 controls the variable delay line 5 so as to generate a delay which cancels out the phase difference. The variable delay line 5 receiving, at its input, the reference clock signal CLK generates, at its output, a delayed clock signal transmitted to the remote member 2, on line 8. Thus, the variable delay line 5 compensates for the delay accumulated on line 8, possibly in the remote member 2 and on line 9. In this way, since the return signal of line 9 is in phase with the reference clock signal CLK, the exchange of data carried out on line 4 is in phase with the reference clock signal CLK at the local member 1.

However, it is not always easy to physically embody line 9 on a track strictly behaving in the same way as the track of line 4. When the integrated circuit 10 is connected to many lines 4, in order to process simultaneously several data exchanges, such as 32, 64 or even more bits of the same memory word, the different tracks of the printed circuit, each one of which physically embodies a line 4, are rarely of identical length. Furthermore, the many tracks of the printed circuit are not necessarily strictly subject to the same temperature constraints and the delays caused on these tracks may vary. For high exchange speeds such as those currently used and even more so for those of the future, these small differences are of considerable importance. Furthermore, for reasons of simplifying circuits and possibly also for the reasons stated above, the remote member 2 does not necessarily generate a return signal on line 9. For at least these reasons, the device of FIG. 1 is not completely satisfactory.

Figure 2:
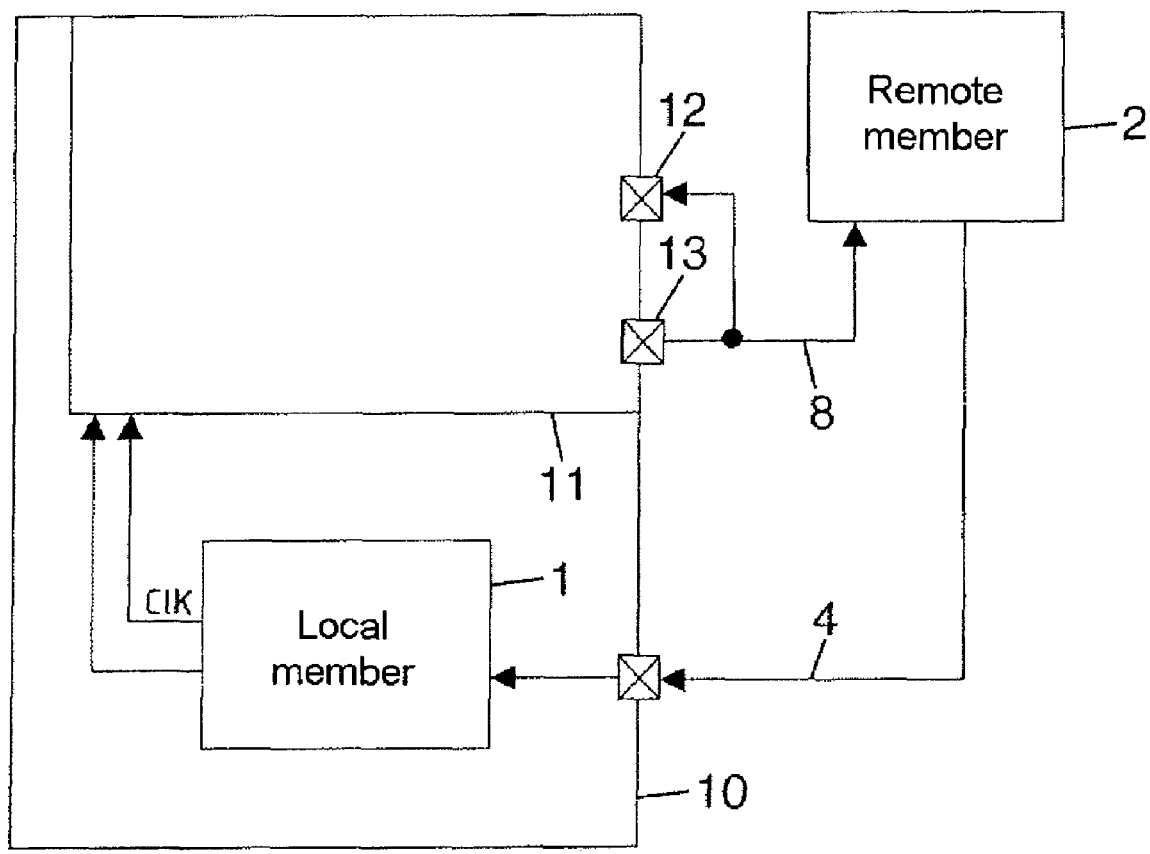
FIG. 2 is a diagram showing the integration of a device according to one embodiment of the present invention in a preferred environment.

FIG. 2 shows the integration of a device according to one embodiment of the present invention in a preferred environment. With reference to FIG. 2, the integrated circuit 10 which contains the local member 1 includes a synchronization device 11 different from that in the integrated circuit of FIG. 1. The synchronization device 11 has a first terminal 12 for collecting a clock signal image received by the remote member on line 8. Here, the clock signal received by the remote member 2 on line 8 is emitted from a second terminal 13.

Figure 3:
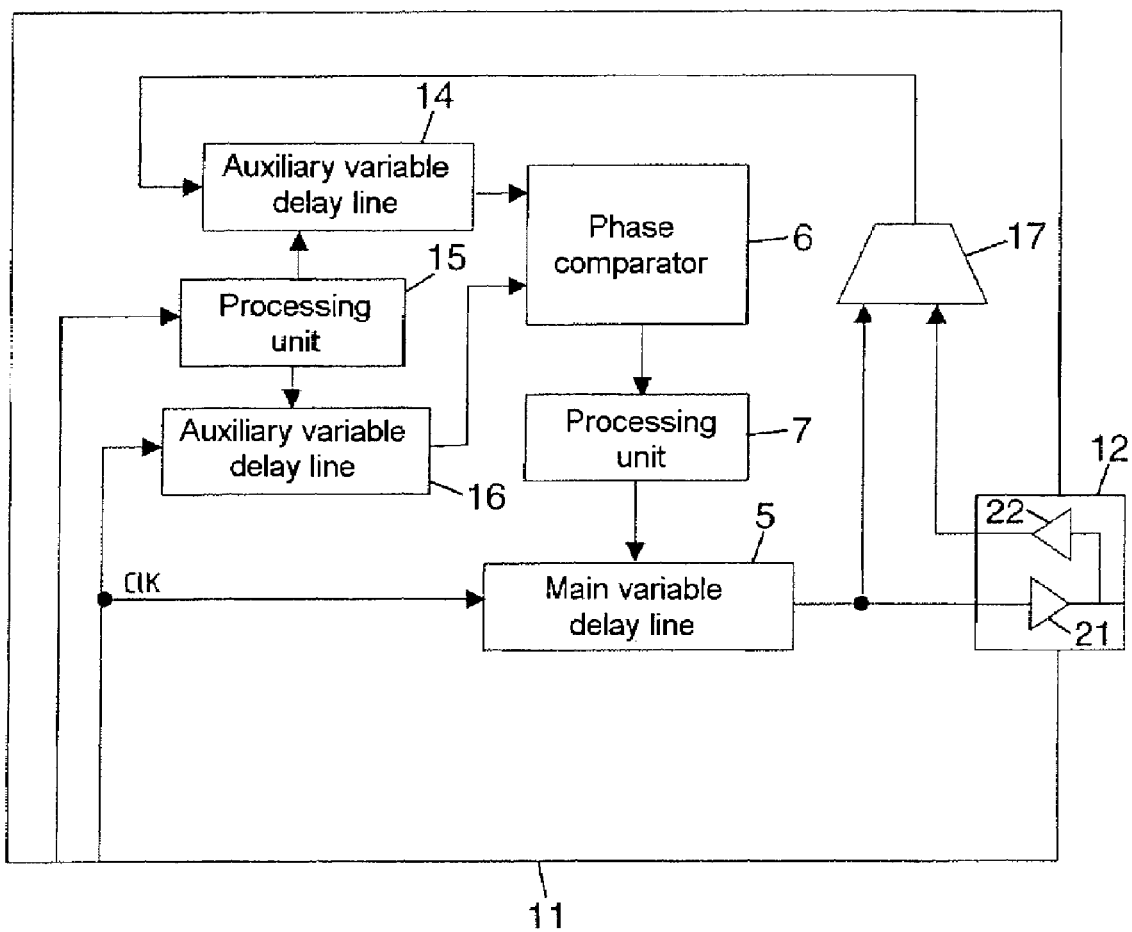
FIG. 3 is a diagram of a device according to a preferred embodiment of the present invention.

FIG. 3 shows the synchronization device 11 of a preferred embodiment of the present invention in more detail. The variable delay line 5 of FIG. 1 can be found in the synchronization device 11. Here, the variable delay line 5 is called the main variable delay line in order to distinguish it from two other variable delay lines 14 and 16, called auxiliary variable delay lines. As in FIG. 1, the main variable delay line 5 is controlled by a processing unit 7 coupled to a phase comparator 6.

However, in the device of FIG. 3, a first input of the phase comparator 6 is connected to one output of the first auxiliary variable delay line 14. A second input of the phase comparator 6 is connected to one output of the second auxiliary variable delay line 16. The input of the first auxiliary variable delay line 14 is connected to a first terminal 12 in order to collect a clock signal image received by the remote member, via a switch 17. The input of the second auxiliary variable delay line 16 is connected to the input of the main variable delay line 5, so as to receive the reference clock signal CLK (like the variable delay line 5 of FIG. 1). A second processing unit 15 is configured in order to control the first and second variable delay lines 14 and 16. The switch 17 inserted between the terminal 12 and the first auxiliary variable delay line 14 makes it possible to alternatively connect the input of the first auxiliary variable delay line 14 to the output of the main variable delay line 5.

Figure 4:
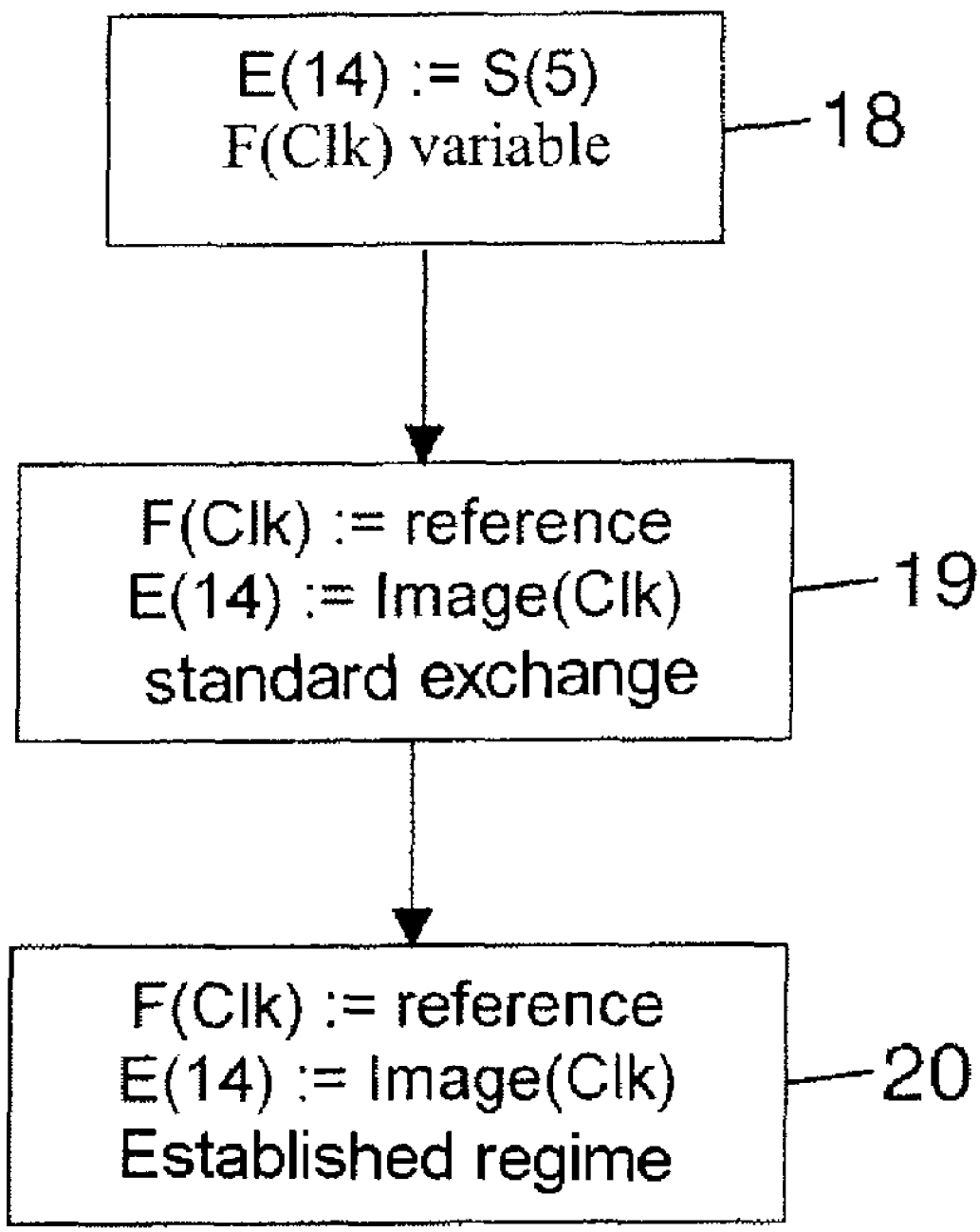
FIG. 4 is a flowchart of a method according to one embodiment of the present invention.

The switch 17 makes it possible to calibrate the synchronization device 11 as will now be explained with reference to FIG. 4.

Two operating regimes can be distinguished for the synchronization device 11. An established regime includes a step 20 for synchronizing, on the reference clock signal, any exchange of data with a remote member. A preparatory regime, which precedes the established regime, includes at least one step 18 for calibrating the synchronization device 11.

The main variable delay line 5 generates a delay of its output over its input which is a function of the control signal received from the processing unit 7. The law of variation of delay as a function of control is a monotonic function having an order which is generally greater than zero. For zero control, the delay generated is equal to a stub (residual period) which results from the intrinsic delays caused by the elements of the main variable delay line 5. When the control signal increases, the delay increases continuously. Many known diagrams exist to make the delay vary continuously as a function of the control signal, without being specific to the subject of the present invention.

The auxiliary variable delay lines 14 and 16 are constructed identically to the main variable delay line 5. The law of variation of delay in the auxiliary variable delay lines 14 and 16 is similar to the law of variation of delay in the main variable delay line 5. In the auxiliary variable delay lines 14 and 16, a stub is found which results from the intrinsic delay of elements of these two auxiliary variable delay lines, which is possibly smaller than the stub of the main variable delay line 5 if the auxiliary variable delay lines 14 and 16 have fewer delay elements. The variation coefficients of the auxiliary variable delay lines 14 and 16 are proportional to the variation coefficients of the main variable delay line 5, possibly smaller if the auxiliary variable delay lines 14 and 16 have fewer elements. By construction, given the number of delay elements which constitute the auxiliary variable delay lines 14 and 16 and the number of delay elements which constitute the main variable delay line 5, it is possible to determine the equation which combines the laws of variation of each of the variable delay lines.

The processing unit 7 acts on the main variable delay line 5 in a closed loop. This is because controlling the main variable delay line 5 is tied to a zero phase difference on the phase comparator 6. In contrast, the second processing unit 15 acts on the auxiliary variable delay lines 14 and 16 in an open loop. It is therefore beneficial to determine the law of variation of delay as a function of the control of the second processing unit 15, in the auxiliary variable delay lines 14 and 16. The auxiliary variable delay lines 14 and 16 are strictly identical and since they are included in the same integrated circuit, the law of variation of delay as a function of the control signal received from the second processing unit 15 is strictly identical for the first auxiliary variable delay line 14 and the second auxiliary variable delay line 16.

In step 18, the switch 17 is set to a state for connecting the output of the main variable delay line 5 to the input of the first auxiliary variable delay line 14. Thus, the delayed clock signal generated at the output of the main variable delay line 5 is subject to the first auxiliary delay of the first auxiliary variable delay line 14 before being input to the first input of the phase comparator 6. In step 18, the second processing unit 15 sends the same control signal to the first auxiliary variable delay line 14 and to the second auxiliary variable delay line 16. Thus, the second auxiliary delay generated by the second auxiliary variable delay line 16 is taken as equal to the first auxiliary delay. In this way, the phase difference received at the input of the phase comparator 6 is equal to the delay image generated by the main variable delay line 5.

In step 18, the frequency of the signal CLK is varied and, for each frequency, the value of the corresponding control signal which is received by the variable delay line 5 is recorded. The control signal of the main variable delay line 5 which cancels out the phase difference at the input of the phase comparator 6 is the control signal which generates a delay in the main variable delay line 5, equal to a clock period of the signal CLK. As such, it is possible to recognize the law of variation of the main delay as a function of the control signal. By homothetic transformation, the law of variation of the auxiliary delays is calculated therefrom as a function of the control signal from the second processing unit 15 for the auxiliary variable delay lines 14 and 16.

In step 20, the frequency F(Clk) of the clock signal CLK is set to the reference frequency for the established regime of data exchange. The switch 17 is set to a state for connecting the terminal 12 to the input of the first auxiliary variable delay line 14. In the established regime, the second processing unit 15 sends different control signals to the first auxiliary variable delay line 14 and the second auxiliary variable delay line 16. The processing unit 7 controls the main variable delay line 5 so as to cancel out the phase difference at the input of the phase comparator 6. When the second processing unit 15 sends control signals of identical value to the first auxiliary variable delay line 14 and the second auxiliary variable delay line 16, the auxiliary delays are equal such that the signal output from the switch 17 is in phase with the reference clock signal CLK. Since the signal output from the switch 17 is equal to the clock signal image received by the remote member, the clock signal image received by the remote member is in phase with the reference clock signal CLK. The main cumulated delay generated by the variable delay line 5 and the unknown cumulated delay of the clock signal received by the remote member with respect to the signal delayed at the output of the main variable delay line 5 are then equal to a whole number of periods of the reference clock signal CLK.

When the second processing unit 15 sends, to the first auxiliary variable delay line 14, a control signal greater than that sent to the second auxiliary variable delay line 16, the auxiliary delay of line 14 is greater than the auxiliary delay of line 16. The processing unit 7 then modifies its control signal so as to decrease the main delay of line 5 in order to keep the phase difference at the input of the phase comparator 6 at zero. Thus, the delayed signal at the output of the main variable delay line 5 is less delayed than before. Consequently, the clock signal received by the remote member is itself also less delayed. The decrease in delay on the clock signal received by the remote member is equal in absolute value to the increase in auxiliary delay generated by the first variable delay line 14 with respect to that generated by the second auxiliary variable delay line 16.

When the second processing unit 15 sends, to the second auxiliary variable delay line 16, a larger control signal than that sent to the first auxiliary variable delay line 14, the auxiliary delay generated by line 14 is less than the auxiliary delay generated by line 16. The processing unit 7 generates a control signal intended for the main variable delay line 5 so as to increase the delay in order to cancel out the phase difference at the input of the phase comparator 6. The delayed signal at the output of the main variable delay line 5 is delayed with a delay greater than before with respect to the reference clock signal CLK. Consequently, the clock signal received by the remote member is itself also delayed with a delay which is greater than before. The increase in delay on the clock signal received by the remote member is equal, in absolute value, to the decrease in auxiliary delay generated by the first auxiliary variable delay line 14 with respect to that generated by the second auxiliary variable delay line 16.

Knowing the law of variation of delays in the auxiliary variable delay lines 14 and 16, it is possible to set the control signals generated by the second processing unit 15 with accuracy so as to impose a difference between the auxiliary delays generated by line 14 and line 16. Since the control signals of the second processing unit 15 are chosen within a continuous range of variations of delay as a function of the control signals of the auxiliary variable delay lines 14 and 16, it is possible to vary the difference in auxiliary delay between the outputs of the first auxiliary variable delay line 14 and the second auxiliary variable delay line 16 positively and negatively around zero, including for a zero value, with accuracy. Since the signal controlling the main variable delay line 5 by the processing unit 7 is itself located within a continuous range of variations of the delays as a function of the control signal, the main delay is therefore itself adjusted accurately around a mean value.

At the output of the switch 17, the signal image received by the remote member is offset with respect to the reference clock signal CLK by a value equal and opposite to the difference of the auxiliary delay generated by line 14 with respect to the auxiliary delay generated by line 16. It is thus possible to control the first and second auxiliary variable delay lines so that the signal image received by the remote member is offset with respect to the reference clock signal, by a phase suitable for synchronizing the exchange of data on the reference clock signal.

If this offset is known a priori, for example from data provided by the manufacturer of the remote member 2 and from the topology of the printed circuit, it is enough to introduce pre-established values for the control of auxiliary variable delay lines 14 and 16 in the second processing unit 15.

Advantageously, in particular if the offset necessary for the correct synchronization of data transfer is not known a priori, the method further includes a second preparatory regime step 19. In step 19, the local member 1 activates an exchange of known data with the remote member and if necessary reiterates this activation by varying the first or the second auxiliary delay until detecting a synchronization of the exchange of known data. For example, these known data are equal to a standard value stored in the local member 1 and in the remote member 2. This makes it possible to carry out feedback control by the second processing unit 15 of commands of auxiliary variable delay lines 14 and 16. When the exchange of data corresponds to the standard value, the offset controlled by the second processing unit 15 is suitable for good synchronization of data exchange. This offset is then retained in the processing unit 15 in order to be used in step 20 in the established regime.

It may happen that there are several possible offsets for synchronizing the exchange of data. In this case, the step 19 may be repeated until obtaining the limits of the operating range. This makes it possible, from recognition of the law of variation of the delay line 5 determined by step 18, to retain the best offset for use in step 20.

Returning to FIG. 2, the delayed signal generated by the main variable delay line 5 is emitted at the output of the integrated circuit 10 on a terminal 13 intended for the remote member. The clock signal image received by the remote member is taken off line 8, not necessarily close to the remote member 2. Specifically, the delay is caused more by the capacitance and self-inductance of the track which physically embodies line 8 than by the path travelled from terminal 13 to the remote member 2. It is mainly the capacitive effect and the inductive effect of the track physically embodying line 8 which cause a delay due to the rise time of the signal. The important point is that the signal image received by the remote member 2 is taken off line 8 in order to be introduced into the integrated circuit 10 by terminal 12.

It will be noted that the diagram of FIG. 2 makes it possible to take the clock signal image received by the remote member from any point of the printed circuit but requires providing additional wiring on the integrated circuit 10. Advantageously, in the diagram shown in FIG. 3, terminal 13 is coincident with terminal 12 so as to facilitate the wiring at the output of the integrated circuit 10. A first galvanic isolation amplifier 21 has one input connected to the output of the main variable delay line 5 and its output intended for connection to a track for transmission to the remote member. The output of the amplifier 21 acts as terminal 13. A second galvanic isolation amplifier 22 has one input connected to the output of the first galvanic isolation amplifier 21 and an output connected to the input of the first auxiliary variable delay line 14 via the switch 17. The input of the amplifier 22 acts as terminal 12.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A device for synchronizing, on a reference clock signal, an exchange of data with a remote member, said device comprising:
   a phase comparator;
   a first processing unit coupled to an output of the phase comparator;
   a main variable delay line controlled by the first processing unit so as to generate a delayed clock signal for transmission to the remote member, one input of the main variable delay line receiving the reference clock signal;
   a first terminal for receiving a clock signal image received by the remote member;
   a first auxiliary variable delay line having one input coupled to the first terminal, and one output coupled to a first input of the phase comparator;
   a second auxiliary variable delay line having one input coupled to the input of the main variable delay line, and one output coupled to a second input of the phase comparator; and
   a second processing unit controlling the first and second auxiliary variable delay lines so that the signal image received by the remote member is offset with respect to the reference clock signal, by a phase suitable for synchronizing the exchange of data on the reference clock signal.

2. The device according to claim 1, further comprising a switch coupled between the first terminal and the input of the first auxiliary variable delay line so as to allow the output of the main variable delay line to be connected to the input of the first variable delay line.

3. The device according to claim 1, wherein the second processing unit includes an input for receiving a data recognition signal.

4. The device according to claim 1, wherein the first terminal includes:
   a first galvanic isolation amplifier having one input coupled to one output of the main variable delay line, and one output for connection to a track for transmission toward the remote member; and
   a second galvanic isolation amplifier having one input coupled to the output of the first galvanic isolation amplifier, and one output coupled to the input of the first auxiliary variable delay line.

5. An information processing system comprising:
   a local member having a reference clock signal;
   a remote member coupled to the local member; and
   a synchronization device for synchronizing, on the reference clock signal, an exchange of data between the local member and the remote member,
   wherein the synchronization device includes:
      a phase comparator;
      a first processing unit coupled to an output of the phase comparator;
      a main variable delay line controlled by the first processing unit so as to generate a delayed clock signal for transmission to the remote member, one input of the main variable delay line receiving the reference clock signal from the local member;
      a first terminal for receiving a clock signal image received by the remote member;
      a first auxiliary variable delay line having one input coupled to the first terminal, and one output coupled to a first input of the phase comparator;
      a second auxiliary variable delay line having one input coupled to the input of the main variable delay line, and one output coupled to a second input of the phase comparator; and
      a second processing unit controlling the first and second auxiliary variable delay lines so that the signal image received by the remote member is offset with respect to the reference clock signal, by a phase suitable for synchronizing the exchange of data on the reference clock signal.

6. The information processing system according to claim 5, wherein the synchronization device further includes a switch coupled between the first terminal and the input of the first auxiliary variable delay line so as to allow the output of the main variable delay line to be connected to the input of the first variable delay line.

7. The information processing system according to claim 5, wherein the second processing unit of the synchronization device includes an input for receiving a data recognition signal from the local member.

8. The information processing system according to claim 5, wherein the first terminal of the synchronization device includes:
   a first galvanic isolation amplifier having one input coupled to one output of the main variable delay line, and one output coupled to the remote member; and
   a second galvanic isolation amplifier having one input coupled to the output of the first galvanic isolation amplifier, and one output coupled to the input of the first auxiliary variable delay line.

9. The information processing system according to claim 5, wherein the local member and the synchronization device are contained in a first integrated circuit, and the remote member is contained in a second integrated circuit.

10. The information processing system according to claim 5, further comprising:
    a printed circuit having tracks,
    wherein the first integrated circuit is connected to the second integrated circuit via the tracks of the printed circuit.

11. The information processing system according to claim 5, further comprising a controller for subjecting a clock signal image received by the remote member to a first auxiliary delay in an established regime, subjecting the reference clock signal to a second auxiliary delay, and comparing the phase difference between the received clock signal image subjected to the first auxiliary delay and the reference clock signal subjected to the second auxiliary delay, so as to offset the clock signal image received by the remote member with respect to the reference clock signal, by a phase suitable for synchronizing the exchange of data on the reference clock signal in the established regime.

12. The information processing system according to claim 11, wherein the controller also subjects the delayed clock signal to the first auxiliary delay, takes the second auxiliary delay to be equal to the first auxiliary delay, and records different values of the control signal, each for a different frequency of the reference clock signal, so as to recognize a law of variation of the main delay, then equal to a clock period, as a function of the control signal.

13. A method for synchronizing, on a reference clock signal, an exchange of data with a remote member, by generating a delayed clock signal transmitted to the remote member having a main delay with respect to the reference clock signal, the main delay being a function of a control signal, in order to cancel out a phase difference received at the input of a phase comparator, said method comprising the steps of:
    subjecting a clock signal image received by the remote member to a first auxiliary delay in an established regime;
    subjecting the reference clock signal to a second auxiliary delay;
    comparing the phase difference between the received clock signal image subjected to the first auxiliary delay and the reference clock signal subjected to the second auxiliary delay, so as to offset the clock signal image received by the remote member with respect to the reference clock signal, by a phase suitable for synchronizing the exchange of data on the reference clock signal in the established regime.

14. The method according to claim 13, further comprising the steps of:
    subjecting the delayed clock signal to the first auxiliary delay;
    taking the second auxiliary delay to be equal to the first auxiliary delay; and
    recoding different values of the control signal, each for a different frequency of the reference clock signal, so as to recognize a law of variation of the main delay, then equal to a clock period, as a function of the control signal.

15. The method according to claim 14, further comprising the steps of:
    subjecting the clock signal image received by the remote member to the first auxiliary delay; and
    activating a succession of at least one exchange of known data with the remote member by making the first and/or second auxiliary delay vary until detecting synchronization of exchange of known data.

16. The method according to claim 14, further comprising the step of allocating each of two values respectively to the first and second auxiliary delays such that the difference between the two values corresponds to a window known a priori for synchronizing data exchanges.

* * * * *